(12) United States Patent
Gazeley (10) Patent No.: US 7,843,502 B2
(45) Date of Patent: Nov. 30, 2010

(54) PROGRAMMABLE BOOST SIGNAL GENERATION METHOD AND APPARATUS

(75) Inventor: William G. Gazeley, Corvallis, OR (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1142 days.

(21) Appl. No.: 11/196,226

(22) Filed: Aug. 3, 2005

(65) Prior Publication Data
US 2007/0042768 A1 Feb. 22, 2007

(51) Int. Cl.
*H04N 3/14* (2006.01)
*H04N 5/335* (2006.01)

(52) U.S. Cl. ........................ 348/294; 348/298; 348/308; 348/312

(58) Field of Classification Search ................ 348/294, 348/298, 304, 308, 312; 250/208.1; 257/291, 257/292
See application file for complete search history.

(56) References Cited

U.S. PATENT DOCUMENTS

2006/0114345 A1\* 6/2006 Wu et al. .................... 348/308

\* cited by examiner

*Primary Examiner*—Yogesh K Aggarwal (57) ABSTRACT

An apparatus and method for generating a programmable boost signal. A first input receives at least one programming control signal. A second input receives a reference signal. The programmable boost signal generation circuit receives the programming control signal and the reference signal and generates a boost signal with at least two programmable levels based on the reference signal. The level of the boost signal is selected by the programming control signal.

11 Claims, 6 Drawing Sheets

PROGRAMMABLE BOOST SIGNAL GENERATION METHOD AND APPARATUS

BACKGROUND OF THE INVENTION

Recently, cellular telephones or handsets equipped with a digital camera (also known as "camera phones") have become available and are a popular item among consumers. By adding a camera functionality to the ubiquitous cellular telephone, consumers are more apt to take digital pictures to share with friends, etc. Furthermore, new camera-enabled mobile applications such as multimedia messaging, visual caller identification, and mobile photo albums have become popular with consumers. These popular applications coupled with the growing worldwide demand for camera-enabled handsets have made mobile imaging an essential feature for handsets in many markets.

Consequently, mobile handsets manufacturers are faced with the need to incorporate the functions of a digital camera into the cellular telephone. Agilent Technologies, Inc., the assignee of the current application, is a market leader in CMOS imaging solutions and a leading supplier of semiconductor solutions for today's highly integrated, feature-rich mobile handsets and offers embedded camera modules for mobile handsets manufactures.

An important component in the camera module is the image sensor integrated circuit that includes a pixel array with a plurality of pixels that are arranged in rows and columns. Each pixel receives light and converts the received light into a corresponding analog signal that represents the received light. Specifically, each pixel in a row is reset to a predetermined signal (e.g., a predetermined reset voltage). The pixels in the row are then integrated for a predetermined time period. During integration, the pixels receive light, which decreases the reset voltage to a signal that represents the amount of light received at the pixel. For example, pixels that have a value close to the reset voltage appear dark in the picture, whereas pixels that have a value close to zero, appear as bright spots in the picture.

One challenge faced by designers is the reduction in the power supply voltage that is caused by consumer demand for longer battery life and longer operating time of the electronic device between charges. Unfortunately, as the power supply voltage is decreased, the dynamic range of the system also decreases.

One approach to increase dynamic range while reducing the power supply voltage is to employ a boost generator that generates a reset voltage (also referred to as a "boost signal") that is higher than the power supply voltage and provides this boost signal to the pixel array.

However, the design of the boost generator pose significant challenges and introduces issues and design concerns. One problem encountered is that the boost capacitance is fixed and unchangeable after the integrated circuit containing the boost capacitor is manufactured. There are instances where it would be convenient to change the boost capacitance after the fabrication of the integrated circuit. Second, certain image capture situations may benefit from a boost signal with a different level than the fixed boost signal level. Unfortunately, the existing boost signal generators only offer a single boost signal level that is set once the integrated circuit is manufactured.

Based on the foregoing, there remains a need for a programmable boost signal generation method and apparatus that overcomes the disadvantages set forth previously.

SUMMARY OF THE INVENTION

According to one embodiment of the present invention, a programmable boost signal generation method and apparatus are described. A first input receives at least one programming control signal. A second input receives a reference signal. The programmable boost signal generation circuit receives the programming control signal and the reference signal and generates a boost signal with at least two programmable levels based on the reference signal. The level of the boost signal is selected by the programming control signal.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A programmable boost signal generation method and apparatus are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Image Sensor 100

Figure 1:
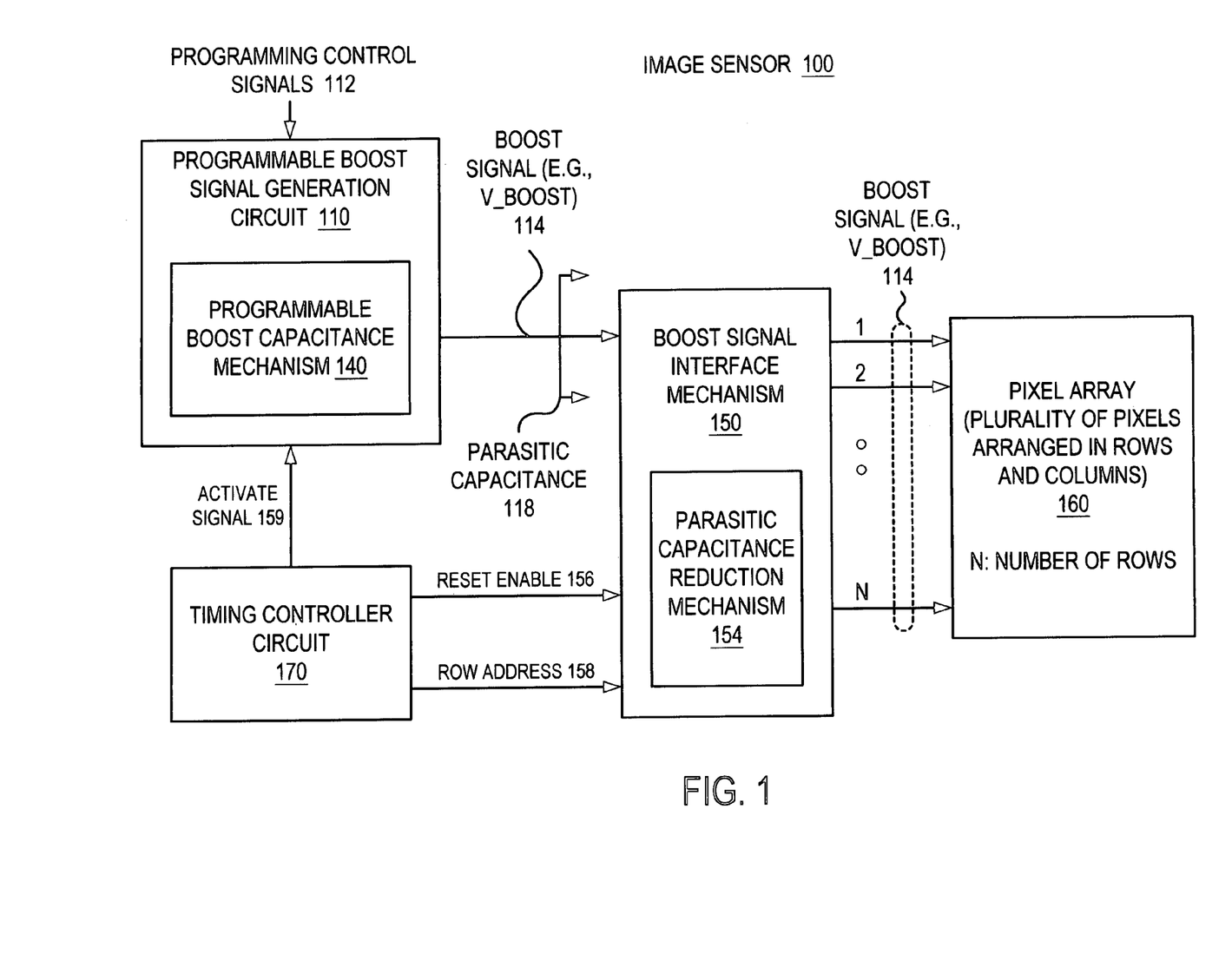
FIG. 1 illustrates a block diagram of an image sensor that includes a programmable boost signal generation mechanism according to one embodiment of the invention.

FIG. 1 illustrates a block diagram of an image sensor that includes a programmable boost signal generation circuit or mechanism 110 according to one embodiment of the invention. The image sensor 100 includes a programmable boost signal generation circuit 110, a pixel array 160, a mechanism for interfacing the boost signal generation circuit 110 with the pixel array (hereinafter referred to as a boost signal interface mechanism 150), and a timing controller circuit 170.

Programmable Boost Signal Generation Circuit 110

The programmable boost signal generation circuit 110 receives one or more programming control signals 112 and based thereon generates a boost signal 114 (e.g., a voltage signal that is referred to herein as V_boost or V_reset) that is above a power supply signal (e.g., an analog power supply voltage signal) in order to increase dynamic range. The programmable boost signal generation circuit 110 generates a boost signal 114 that is adjustable or programmable to at least two different signal levels. The particular signal level is set or controlled or programmed through the programming control signals 114. In one embodiment, there are L programming control signals and $2^L$ number of selectable or programmable levels for the boost signal 114.

The programmable boost signal generation circuit 110 also includes a programmable boost capacitance mechanism 140 that selectively adjusts the boost capacitance (C_boost) to compensate for changes in the boost signal so that the output swing of an amplifier (e.g., an operational amplifier) utilized by the boost signal generation circuit 110 is maintained at a required or specified range. The programmable boost signal generation circuit 110 is described in greater detail hereinafter with reference to FIGS. 2-4.

In one embodiment, the programmable boost signal generation circuit 110 is implemented with a charge pump mechanism that employs a boost capacitor to distribute charge from the boost capacitor to a load capacitor (e.g., the capacitors in each pixels of a selected row in the pixel array). This redistribution of charge causes a voltage change at the load capacitor that in turn resets the voltage at a particular node in the pixel, for example, in preparation for integration (e.g., collection of light).

The timing controller circuit 170 generates a row address 158, a reset enable signal 156, and an activate signal 159 that when asserted activates the boost signal generation circuit 110. The timing controller circuit 170 also generates row timing signals (e.g., the reset enable signal 156 that initiates integration and a row select signal that initiates readout of pixel values), column address, and column timing signals that are not shown. The construction and operation of timing controller circuit 170 is known by those of ordinary skill in the art and will not be described in greater detail herein. Preferably, the timing controller circuit 170 generates a row address 158 and a reset enable signal 156.

The boost signal interface mechanism 150 is coupled to the boost generation circuit 110 and the pixel array 160 and provides an interface there between. For example, boost signal interface mechanism 150 (also referred to herein as "boost signal interface circuit") includes an input that receives the boost signal 114 from the boost signal generation circuit 110, a second input that receives a reset enable signal 156 (also referred to herein as "enable reset signal"), and a third input for receiving the row address signals 158. The boost signal interface mechanism 150 selectively provides the boost signal 114 to one of the rows of the pixel array 160 based on the reset enable signal 156 and the control signals 158.

The boost signal interface mechanism 150 includes a parasitic capacitance reduction mechanism 154. The effective parasitic capacitance reduction mechanism 154 reduces the effective parasitic capacitance (C_L) 118 (e.g., the parasitic capacitance or capacitive load seen by the boost generation circuit 110). By minimizing or reducing the effective parasitic capacitance of the interface mechanism 150, one embodiment of the invention advantageously conserves space or area by reducing the size of the boost capacitor. Consequently, the size of the boost capacitor of the programmable boost signal generation circuit 110 can be reduced to a size that is less than if the programmable boost signal generation circuit 110 were exposed to a larger parasitic capacitance without the interface 150.

The pixel array 160 includes a plurality of pixels that can be arranged in rows and columns. In this example, the number of rows in the pixel array 160 is denoted by "N." For example, pixel array 160 can be a mega-pixel array that has over a million pixels. In this case, the number of rows (N) typically is equal to or greater than 1024, and the number of columns typically also is equal to or greater than 1024. It is noted that the boost signal interface mechanism 150 can be applied to pixels arrays having any size (e.g., an A×B pixel array with A rows and B columns).

It is noted that the programmable boost signal generation circuit 110 may be implemented partially in other components, implemented entirely in other components, or implemented separate from components, such as the power supply section of the integrated circuit, the timing controller circuit 170, the boost signal interface mechanism 150, and the pixel array 160.

The programmable boost signal generation mechanism 110 according to the invention provides several advantages over a static boost signal generator. For example, programmable boost signal generation mechanism 110 according to the invention provides flexibility to adjust the boost signal level even after an integrated circuit has been fabricated by utilizing the programming control signals. Also, the programmable boost signal generation mechanism 110 enables the control or the dynamic adjustment of the boost signal level, thereby providing improved performance for the image sensor in certain situations. One situation is a short-exposure, high dynamic range scene, where a higher boost signal level is needed to increase the dynamic range of the pixels. Another situation is a long-exposure time, low light image, where a reduced boost signal level is needed to reduce dark-current induced pixel image noise. In this manner, the programmable boost signal generation mechanism 110 according to the invention provides flexible options for adjusting the boost signal level after manufacture of the integrated circuit and for adjusting the boost signal level to improve the quality of the captured image that were unavailable previously with a static boost generator.

Programmable Boost Signal Generation Mechanism

Figure 2:
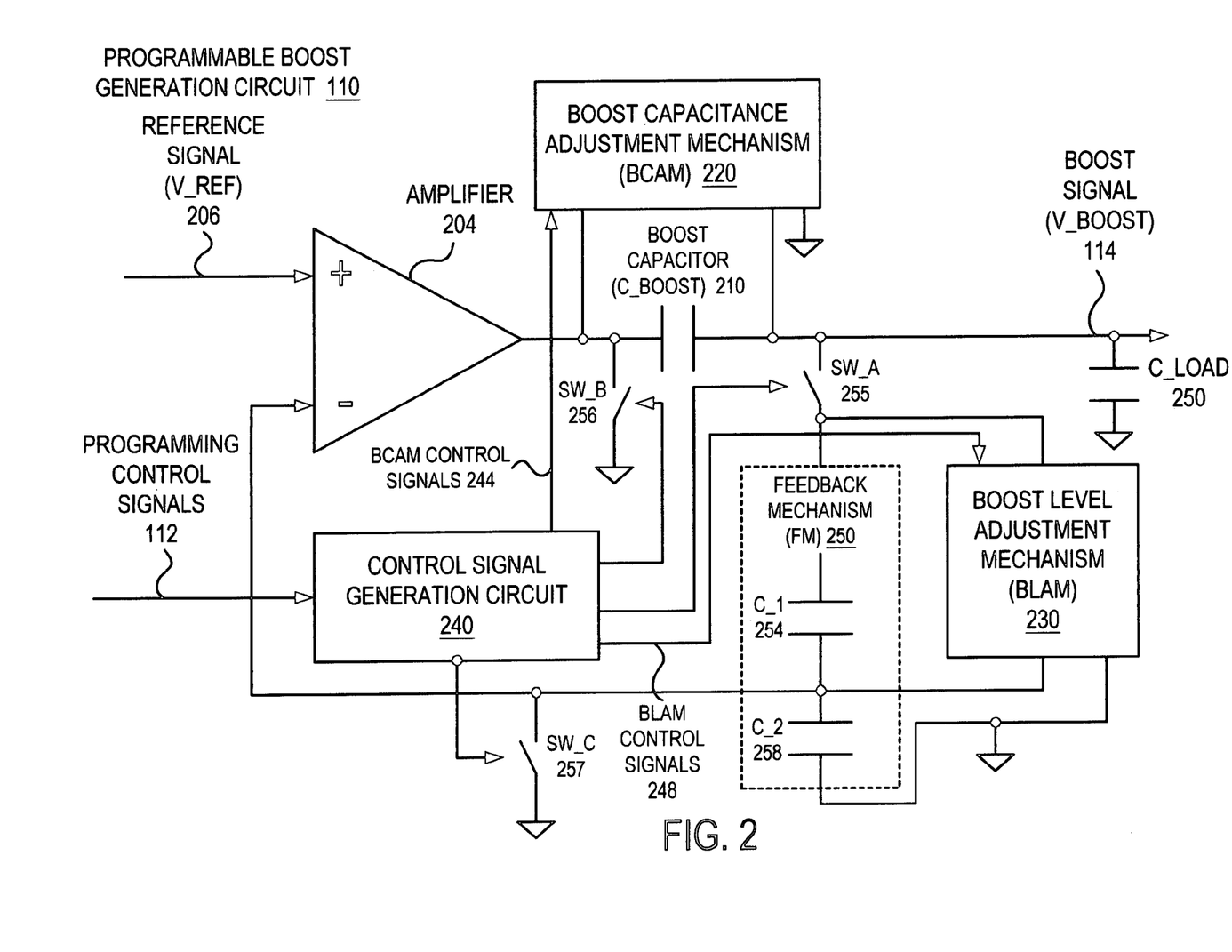
FIG. 2 illustrates in greater detail the programmable boost signal generation mechanism of FIG. 1 according to a first embodiment of the invention.

FIG. 2 illustrates in greater detail the programmable boost signal generation mechanism 110 of FIG. 1 according to a first embodiment of the invention. The programmable boost signal generation mechanism 110 includes an amplifier 204 (e.g., an operational amplifier (OPAMP)) that has a first input (e.g., non-inverting input), a second input (e.g., an inverting input), and an output. The non-inverting input receives a reference signal 206 (e.g., a voltage reference signal (V_ref)). The reference signal can be a filtered version (V_ref') of a predetermined reference signal (e.g., a voltage reference signal (V_ref)). The V_ref signal typically has a reduced noise level when compared to V_ref. In one embodiment, V_ref is about 1.2V silicon (Si) bandgap voltage and is generated by a bandgap signal generator. Optionally, V_ref may be provided from an external input or internally generated.

The programmable boost signal generation mechanism 110 also includes a boost capacitor 210 (which is referred to herein also as C_boost) that is coupled to the output of the amplifier 204. The programmable boost signal generation mechanism 110 also includes a boost capacitance adjustment mechanism (BCAM) 220 that is coupled in parallel to the boost capacitor 210, a boost level adjustment mechanism (BLAM) 230, and a control signal generation circuit 240. The boost level adjustment mechanism (BLAM) 230 includes a first electrode that is selectively coupled to the V_boost node through a switch SW_A 255, a second electrode that is coupled to the inverting input of the amplifier 204, and a third electrode that is coupled to a predetermined signal (e.g., ground signal). The boost capacitance adjustment mechanism (BCAM) 220 selectively provides adjustments to the boost capacitance, and the boost level adjustment mechanism (BLAM) selectively provides adjustments to the boost level of the boost signal.

The control signal generation circuit 240 receives one or more programming control signals 112 and based thereon generates one or more control signals (e.g., BCAM control signals 244 and BLAM control signals 248) for controlling the BCAM 220 and the BLAM 230. The controller or programming circuit 240 provides one or more control signals 244, 248 to vary, adjust, or program the boost signal 114. In one embodiment, two control signals are provided to provide four distinct levels for the boost signal 114. However, it is noted that any number of control signals may be utilized to realize a corresponding number (L) of output levels for the boost signal, where L is equal to $2^N$, where N is the number of control signals or control inputs. In one embodiment, the various switches and their respective timing are controlled by an internal timing block, which sequences the various switches with delays to minimize noise and charge injection.

In one embodiment, the boost capacitance adjustment mechanism (BCAM) 220 alters or adjusts the boost capacitance by a capacitance value in the range of about 1 pF to about 2 pF, and the boost level adjustment mechanism (BLAM) 230 alters or adjusts the boost level of the boost signal in the range from about 2.6V to about 3.0V with a power supply voltage of about 2.5V. C_load 250 represents parasitic capacitance, the capacitive load presented by the pixel row's reset inputs, and other load capacitances.

The programmable boost signal generation mechanism 110 includes a feedback mechanism 250 that provides the signal at the second electrode of the boost capacitor 210 (e.g., the signal at the V_boost node) to the inverting input of the amplifier 204.

During an idle state or mode, the boost signal (V_boost) 114 is held at an analog power supply level (e.g., AVDD). The amplifier (e.g., operational amplifier) 204 is preferably powered off during the idle state in order to conserve power. According to one embodiment, during an active state or active mode, the boost signal (V_boost) 114 is driven to a level that is above the analog supply voltage (AVDD) according to the following:

$$V\_boost = V\_ref * G.$$

The gain factor (G) may be determined by the following expression: G=(C_1+C_2)/C_1. According to one embodiment, the feedback mechanism 250 is implemented with a capacitive voltage divider that includes a first capacitor C_1 254 and a second capacitor C_2 258. It is noted that the feedback mechanism 250 may be implemented by employing other circuit elements to form other types of voltage dividers. In one embodiment, C_boost, C_1 and C_2 are implemented as on-chip capacitors with predetermined values.

In one embodiment, to achieve the programming range with a V_boost from about 2.63V to about 3.0V based on an input reference voltage of 1.2V, the maximum ratio of C_t/C_1, which is also referred to as a gain factor (G), is about 2.5, where the total capacitance (C_1) is equal to C_1+C_2+C_f1+C_f2. By substituting the above values for V_ref and the gain factor (G) into the above equation, V_boost=V_ref*G. V_boost is calculated to be equal to the product of 1.2 and 2.5, which is 3.0V. The minimum ratio of C_t/(C_1+C_f1+C_f2), which is also referred to as a gain factor (G), is about 2.193. By substituting the V_ref value and this new gain factor (G) into the equation, V_boost=V_ref*G. V_boost is calculated to be equal to the product of 1.2 and 2.193, which is about 2.63V.

It is noted that the effective divider capacitances can depend on such factors as the size of the capacitive load (C_load), the value of the reference signal, the amount of boost required, and other design constraints noise, area, and matching.

It is noted that adjusting the boost level may require a corresponding adjustment of the boost capacitor value in order to maintain operation of the operational amplifier 204 in a prescribed or desired output voltage range.

The programmable boost signal generation mechanisms according to the invention enable a circuit that utilizes these mechanisms to be utilized in different applications with different power supply levels. In this manner, the programmable boost signal generator according to the invention can adapt an integrated circuit (IC) in which it is incorporated to different power supplies.

Various switches (e.g., SW_A 255, SW_B 256, and SW_C 257) for initialization are provided in the circuit 110. For example, the switch SW_A 255 between the top of C1 254 and the V_boost node is open during a 'zeroing' phase, which occurs prior to the boost phase. At the same time, one or more switches (e.g., switch SW_C 257) may be provided to connect the top plates of C1 and C2 to ground. This operation removes all charge from the capacitors so that the capacitors are properly initialized. Also during this phase, the inverting input of the operational amplifier is disconnected from the C1/C2 divider and another switch may be provided to connect that amplifier input to the reference voltage in order to reduce charge injection errors.

In other embodiments, additional switches may be provided on the boost capacitor to initialize the boost capacitor prior to boosting. By developing the greatest voltage across the capacitor, the greatest charge is stored for subsequent redistribution. For example, the bottom plate of the boost capacitor can be switched to ground through SW_B 256 during the initialization phase and then switched into the amplifier output during boost phase. Also, when the operational amplifier is powered down, its output is at ground. On the top plate of the boost capacitor a switch may be provided to connect the Vboost node to AVDD. Thus, the precharge voltage across the capacitor is AVDD.

It is noted that in one embodiment, test circuits are provided to offer two test modes: a first mode in which the reference voltage input (V_ref) is sent to an output pad to verify that a circuit path is complete; and a second mode in which the output of the amplifier 204 is also multiplexed to an output pad to measure the amplifier's output voltage and to ensure that the output is in a predetermined proper range. Both of these outputs may be provided through a separate buffer amplifier, which is powered off during normal operation. These circuits are not needed for normal operation, but these test circuits can be very useful during diagnostics or testing of the circuit.

Exemplary Circuit Implementation of Boost Capacitance Adjustment Mechanism (BCAM)

Figure 3:
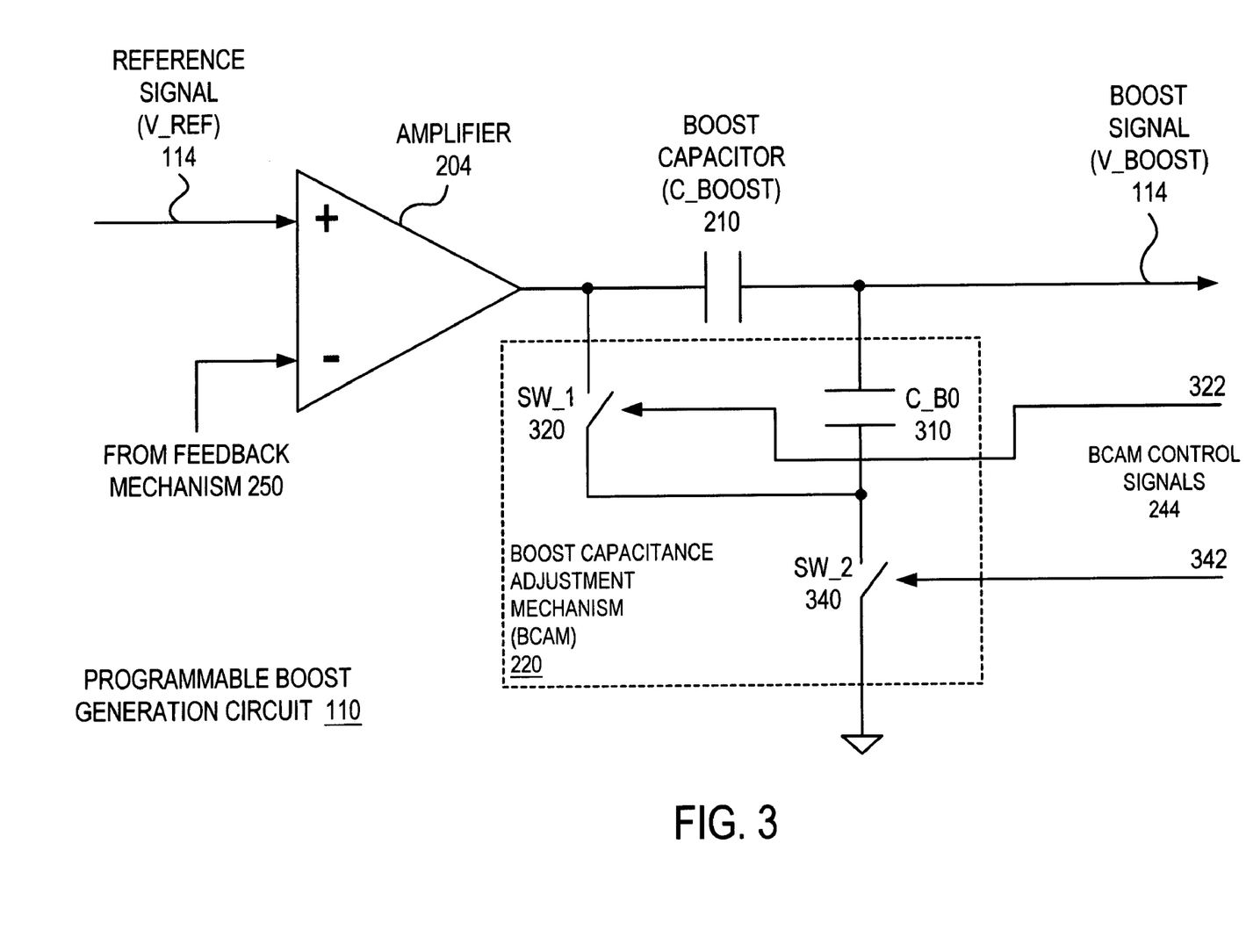
FIG. 3 illustrates the programmable boost signal generation mechanism of FIG. 2 with an exemplary circuit implementation of the boost capacitance adjustment mechanism (BCAM) according to one embodiment of the invention.

FIG. 3 illustrates the programmable boost signal generation mechanism 110 of FIG. 2 with an exemplary circuit implementation of the boost capacitance adjustment mechanism (BCAM) 220 according to one embodiment of the invention. The boost capacitor (C_boost) 210 includes a first electrode that is coupled to the output of the amplifier 204 and a second electrode. The BCAM 220 includes a first switch (SW_1) 320 that includes a first electrode that is coupled to the output of the amplifier 204 (or the first electrode of the boost capacitor 210), a second electrode, and a third electrode (e.g., a gate electrode or control electrode) that is coupled to receive a BCAM control signal (e.g., control signal 322). The BCAM 220 includes a first boost capacitance adjustment capacitor (C_B0) 310 with a first electrode coupled to the second electrode of the boost capacitor 210 and a second electrode that is coupled to the second electrode of the first switch (SW_1) 320. When the first switch (SW_1) 320 is closed, the boost capacitance adjustment capacitor (C_B0) is coupled in parallel to the boost capacitor (C_boost) 210 so that the boost capacitance of the boost circuit 110 is changed to a modified or new value, which is equal to the parallel capacitance of C_boost and C_B0. The BCAM 220 also includes a second switch (SW_2) 340 that includes a first electrode that is coupled to the second electrode of C_B0, a second electrode coupled to a predetermined signal (e.g., a ground signal) and a third electrode (e.g., a gate electrode or control electrode) that is coupled to receive a BCAM control signal (e.g., control signal 342). It is noted that other boost adjustment capacitors with associated switches may be provided to further modify the boost capacitance of the programmable boost generation circuit 110.

The second switch 340 selectively couples the second electrode of C_B0 to a predetermined signal (e.g., a ground signal). The first switch 320 and the second switch 340 are controlled by a first BCAM control signal 322 and a second BCAM control signal 342, respectively. It is noted that the number of boost capacitance adjustment capacitors (C_B0, C_B1, C_B2, ... C_BN) and corresponding switches may be varied or adjusted to suit the requirements of a particular application and is not limited to the specific implementation shown in FIG. 3.

Exemplary Circuit Implementation of Boost Level Adjustment Mechanism (BLAM)

Figure 4:
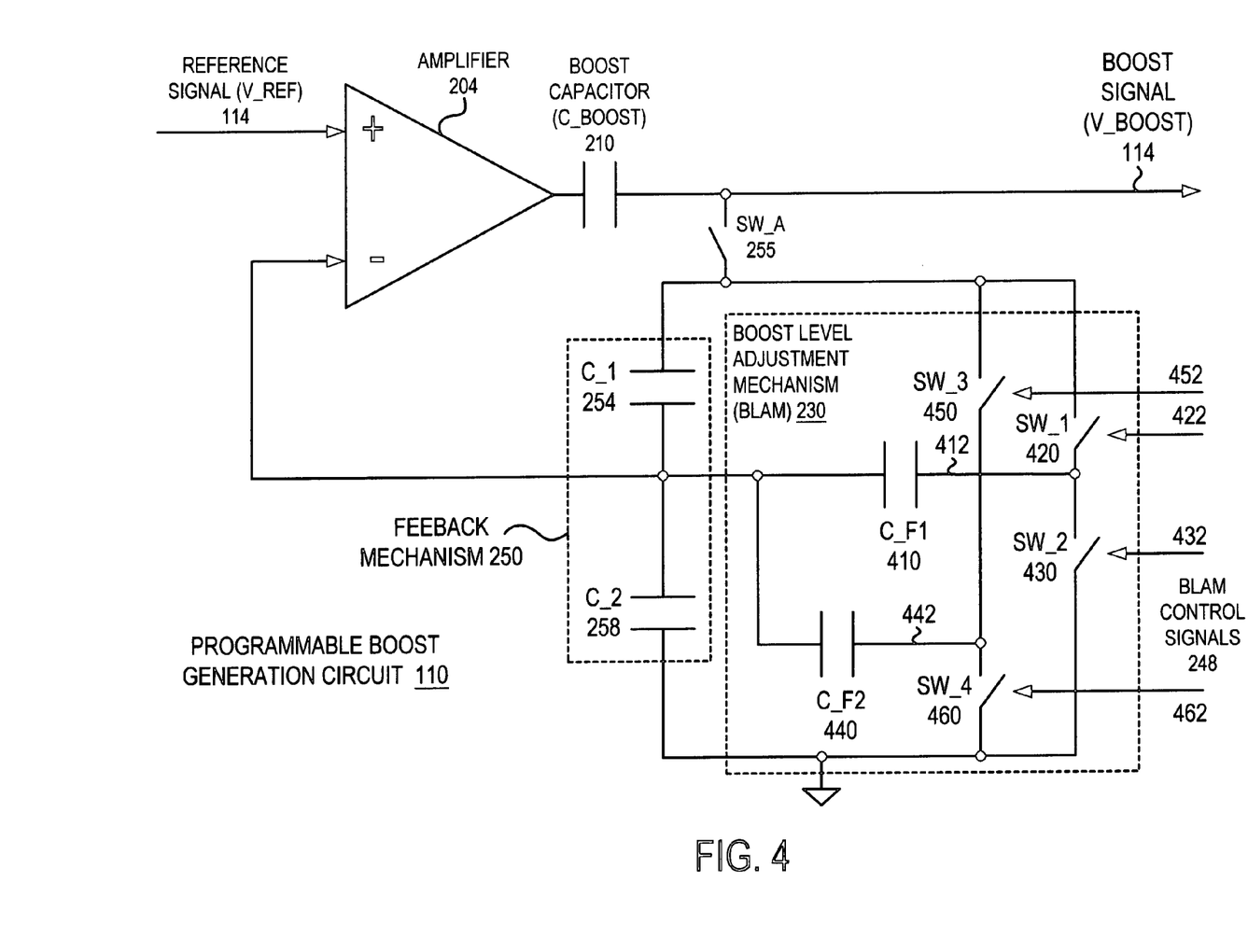
FIG. 4 illustrates the programmable boost signal generation mechanism of FIG. 2 with an exemplary circuit implementation of the boost level adjustment mechanism (BLAM) according to one embodiment of the invention.

FIG. 4 illustrates the programmable boost signal generation mechanism 110 of FIG. 2 with an exemplary circuit implementation of the boost level adjustment mechanism (BLAM) 230 according to one embodiment of the invention. As described previously, the programmable boost signal generation mechanism 110 includes a feedback mechanism 250 that provides the signal at the second electrode of the boost capacitor 210 (e.g., the signal at the V_boost node) to the inverting input of the amplifier 204. According to one embodiment, the feedback mechanism 250 is implemented with a voltage divider that includes a first capacitor C_1 254 and a second capacitor C_2 258.

The BLAM 230 includes a first capacitor (C_F1) with a first electrode coupled to the inverting input of the amplifier 204 and a second electrode coupled to a first intermediate node 412. The BLAM 230 further includes and a first switch (SW_1) 420 that includes a first electrode that is selectively coupled to the boost capacitor 210 through a switch SW_A 255, a second electrode coupled to the first intermediate node 412, and a third electrode (e.g., a gate electrode or control electrode) that is coupled to receive a BLAM control signal 422. The BLAM 230 also includes a second switch (SW_2) 430 that includes a first electrode that is coupled to the first intermediate node 412, a second electrode that is coupled to a predetermined signal (e.g., a ground potential signal), and a third electrode (e.g., a gate electrode or control electrode) that is coupled to receive a BLAM control signal 432.

The BLAM 230 also includes a second capacitor (C_F2) 440 with a first electrode coupled to the inverting input of the amplifier 204 and a second electrode coupled to a second intermediate node 442. The BLAM 230 further includes a third switch (SW_3) 450 that includes a first electrode that is selectively coupled to the boost capacitor 210 through a switch SW_A 255, a second electrode coupled to the second intermediate node 442, and a third electrode (e.g., a gate electrode or control electrode) that is coupled to receive a BLAM control signal 452. The BLAM 230 also includes a fourth switch (SW_4) 460 that includes a first electrode that is coupled to the second intermediate node 442, a second electrode that is coupled to a predetermined signal (e.g., a ground potential signal), and a third electrode (e.g., a gate electrode or control electrode) that is coupled to receive a BLAM control signal 462.

It is noted that the number of capacitors (e.g., C_F1, C_F2, ... C_FN) and corresponding switches (SW_1, SW_2, ... SW_M) between the boost capacitor node and the intermediate node or between the intermediate node and the ground node may be varied or adjusted to suit the requirements of a particular application and is not limited to the specific implementation shown in FIG. 4.

It is noted that the number of programmable levels for the boost signal can be adjusted to suit the requirements of a particular application. Similarly, the number of boost capacitors and the number of trim capacitors can be adjusted to suit the requirements of a particular application. When the top plate of the boost capacitor is pre-charged to a reference voltage that is less than the analog power supply voltage (AVDD), the final boost level may be below the analog power supply voltage (AVDD).

It is noted that the above circuit implementation is based on signals that are active high signals. However, it is noted that one or more of the signals may be active low signals. In this case, one of ordinary skill in the art can readily re-configure the circuit to perform the desired function, where one or more of the signals are active low signals. In one embodiment, the transistors can be implemented with MOS field effect transistors (e.g., p-channel MOSFETs and n-channel MOSFETs). However, it is noted that other types of transistors and switches may be utilized to implement the programmable boost signal generation mechanism according to the invention.

Processing Performed by the Boost Signal Generation Mechanism

Figure 5:
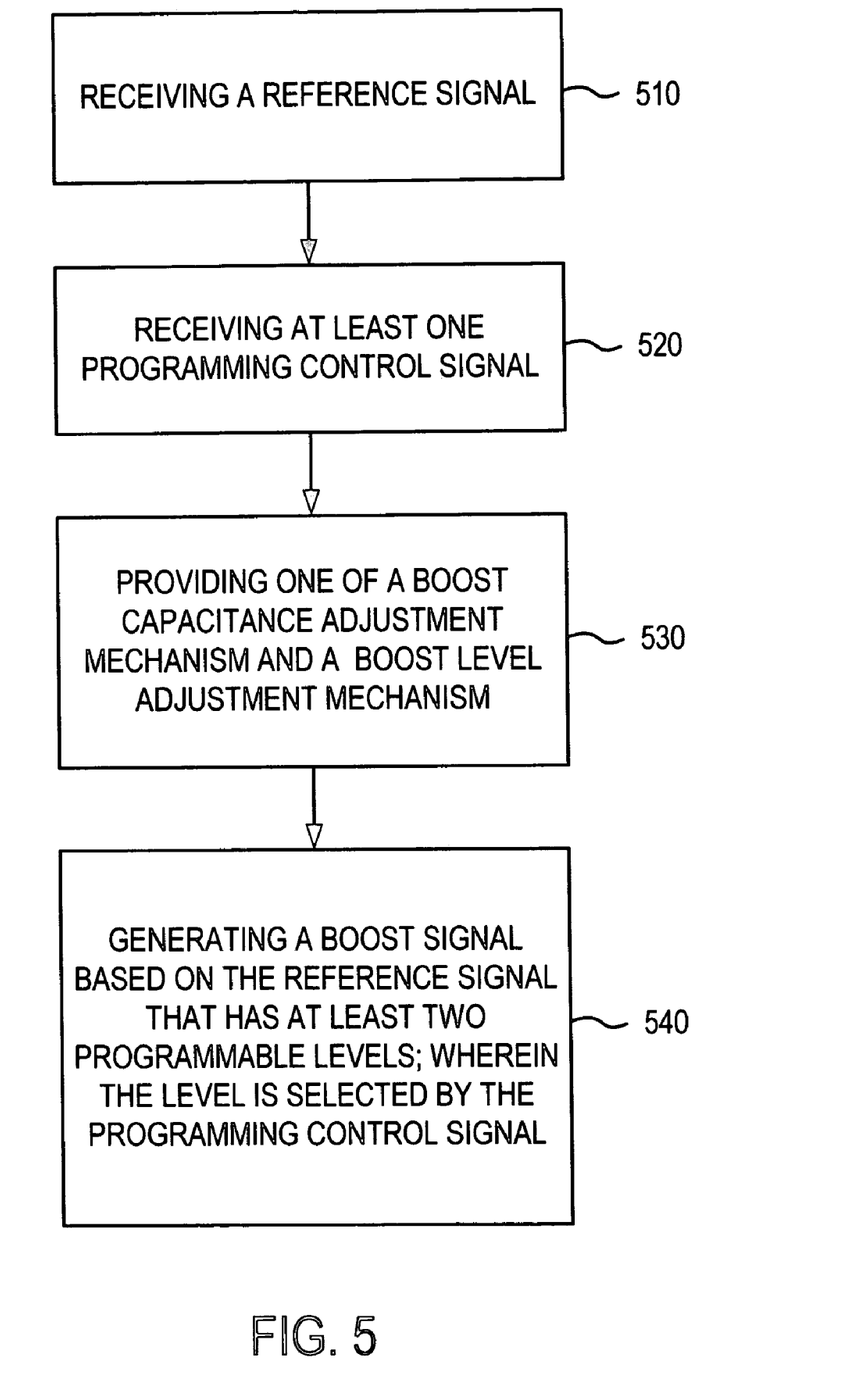
FIG. 5 is a flowchart illustrating a method performed by the programmable boost signal generation mechanism of FIG. 2 according to one embodiment of the invention.

FIG. 5 is a flowchart illustrating a method performed by the programmable boost signal generation mechanism 110 of FIG. 2 according to one embodiment of the invention. In step 510, a reference signal (e.g., a voltage reference signal, V_ref) is received. In step 520, at least one programming control signal (e.g., control signal 112) is received. In step 530, a boost capacitance adjustment mechanism 220 is provided, a boost level boost adjustment mechanism 230 is provided, or both are provided. The boost capacitance adjustment mechanism 220 selectively adjusts the boost capacitance (C_boost) based on one or more control signals (e.g., BCAM control signals 244). The boost level adjustment mechanism selectively adjusts the boost level of the boost signal based on one or more control signals (e.g., BLAM control signals 248).

In step 540, a boost signal (e.g., a voltage signal, V_boost) 114 is generated based on the reference signal 206. The boost signal 114 has at least two programmable levels, where the level is selected by the programming control signal 112. In one example, a boost signal 114 is generated at a level that is determined or specified by the programming control signals 112. For example, a boost signal (e.g., a voltage boost signal, V_boost) 114 is generated whose signal level is based on or dependent on at least one programming control signal 112 that is provided directly to or utilized to generate one or more other control signals (e.g., 244, 248) and then provided to either the boost capacitance boost adjustment mechanism 220 or the boost level boost adjustment mechanism 230.

Figure 6:
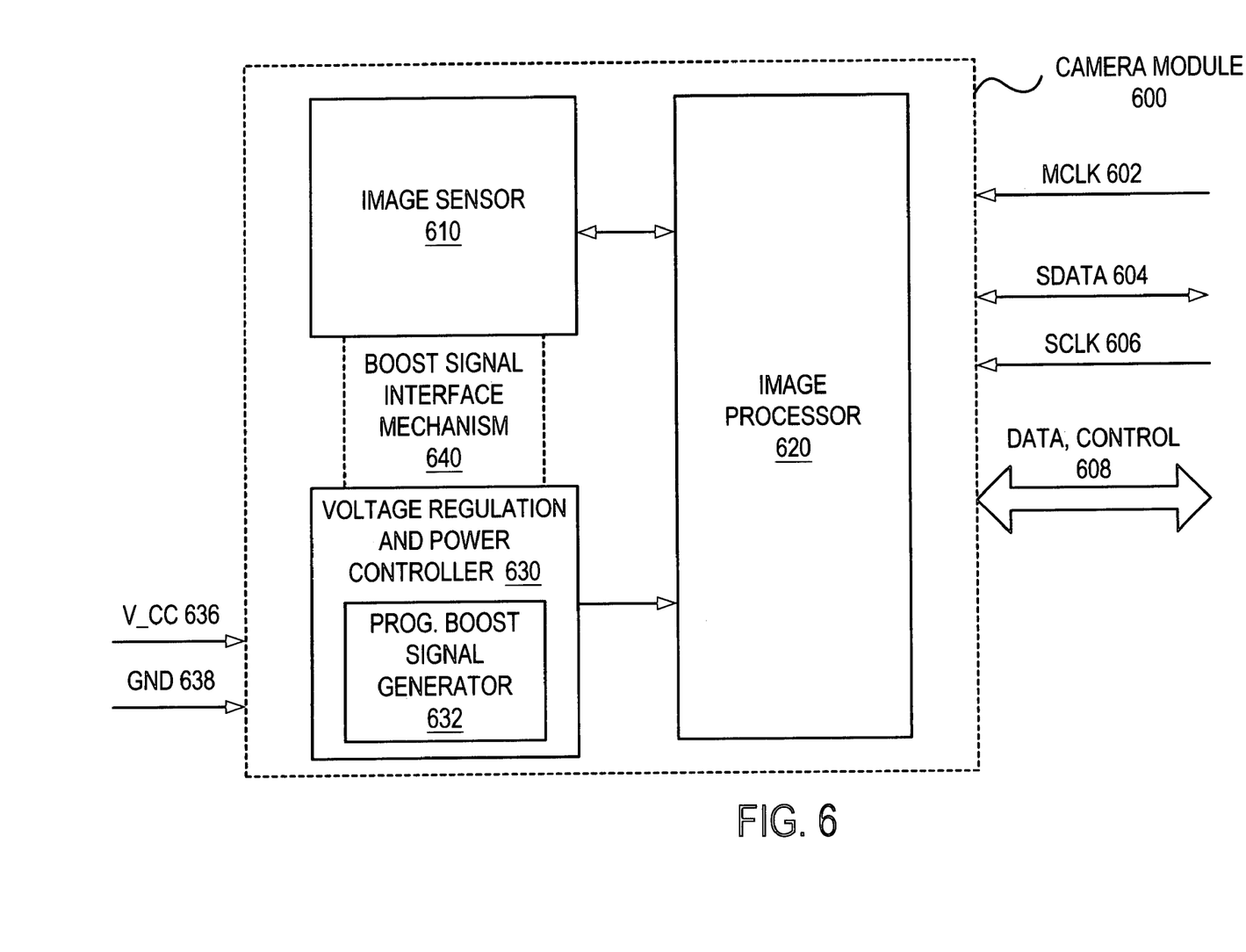
FIG. 6 is a block diagram illustrating a camera module that includes the programmable boost signal generation mechanism according to one embodiment of the invention.

Implementation of the Programmable Boost Signal Generation Mechanism in a Camera Module FIG. 6 is a block diagram illustrating a camera module 600 that includes the programmable boost signal generation mechanism 632 according to one embodiment of the invention. The camera module 600 also includes an image sensor 610, an image processor 620, a power regulation circuit 630, an interface mechanism 640, and optics (not shown), such as a F2.8 lens. The image sensor 610 converts light into electrical signal representing the received light (e.g., integration and readout). The image sensor 610 can also perform signal processing on the electrical signals in the analog domain. The image sensor 610 then converts the analog signals into the digital domain for storage or further processing by the image processor 620. The image processor 620 performs image compression (e.g., JPEG compression), conversion between different image formats, and other image processing as described in greater detail hereinafter. The interface mechanism 640 provides an interface between the programmable boost signal generator 632 and the image sensor 610.

Camera modules (e.g., Agilent ADCM-3800 1.3 Megapixel Resolution CMOS Camera Module) are available from the assignee of the present application. The camera module 600 includes an input for receiving a clock signal 602 (e.g., MCLK signal) and inputs for receiving power signals (e.g., GND 638 and V_CC 636). The camera module 600 also includes a parallel output for providing data and control signals 608 and a serial port that includes a SDATA signal 604 and a SCLK signal 606.

The image sensor 610 can include hardware, software, firmware or a combination thereof to perform one or more of the following operations: A/D conversion, control of the window size, adjusting pixel gain (e.g., color gain ratios), and timing control.

The image processor 620 can include hardware, software, firmware or a combination thereof to perform one or more of the following operations: automatic exposure, automatic white balance processing, automatic flicker correction, pixel correction, demosaic processing, sharpening, sizing, color balance processing, gamma correction, color space conversion (e.g., RGB or YCbCr), downsampling, and compression (e.g., JPEG).

A voltage regulation and power control functional block 630 receives a ground (GND) potential signal 638 and a power signal 636 (e.g., V_CC). The voltage regulation and power control functional block 630 provides power to the remaining functional blocks (e.g., the image sensor and the image processor). In one embodiment, a programmable boost signal generation circuit 632 that generates a boost signal with an adjustable signal level is incorporated in the voltage regulation and power control functional block 630.

In one example, the camera module 600 that includes the programmable boost signal generator 632 is incorporated into a cellular telephone camera ("camera telephone"). The camera telephone includes a power supply (e.g., a battery), cellular telephone electronics, and a camera module. The operation and construction of cellular telephone electronics are known by those of ordinary skill in the art and will not be described further herein.

The programmable boost signal generation mechanism according to the invention may be incorporated into a variety of different electronic devices that include, but are not limited to, mobile phones, video phones, personal digital assistants, image-enabled appliances, digital image capture cameras (e.g., still and video cameras), digital still mini cameras, embedded automotive applications, and monitoring equipment.

It is noted that the programmable boost signal generation mechanisms according to the invention are not limited to a particular pixel array architecture. For example, in a three-transistor (3T) pixel architecture, the programmable boost signal generation mechanisms according to the invention can be utilized to drive a pixel reset signal. In a four-transistor (4T) pixel architecture, the programmable boost signal generation mechanisms according to the invention can be utilized to drive a transfer gate signal. It is further noted that the programmable boost signal generation mechanisms according to the invention are not limited to the embodiments and applications described above, but instead can be utilized for other applications, where a signal that is greater than the power supply signal is needed.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus for generating a boost signal to a pixel array that includes a plurality of rows, the apparatus comprising:
    a first input that receives at least one programming control signal;
    a second input that receives a reference signal;
    an output;
    a first capacitor having a first node and a second node, the first node being coupled to the second input, the second node being connected to the output;.
    at least one second capacitor having a first node and a second node, the second nodes of the at least one second capacitor being directly connected to the second node of the first capacitor;
    a switching circuit controllable by the reference signal, the switching circuit having at least a first mode and a second mode, wherein when the switching circuit is in the first mode, the first node of the first capacitor is not connected to the first node of the at least one second capacitor, and wherein when the switching circuit is in the second mode, the first node of the first capacitor is directly connected to the first nodes of the at least one second capacitor.

2. The apparatus of claim 1 wherein the apparatus includes an amplifier that includes a first input that receives the reference signal and an output, wherein the first node of the first capacitor is coupled to the output of the amplifier.

3. The apparatus of claim 1 and further comprising a plurality of capacitors that are directly connectable in parallel with said first capacitor and wherein said switching circuit has a plurality of modes for directly connecting said plurality of capacitors to said first capacitor.

4. The apparatus of claim 1 wherein the switching circuit includes a mechanism that selectively provides a selected number of capacitors to be directly connected in parallel to the first capacitor.

5. The apparatus of claim 4 wherein the apparatus further comprises an amplifier comprising a first input, a second input, and an output, wherein the first node of the first capacitor is connected to the output of the amplifier and the reference signal is connected to the first input of the amplifier.

6. The apparatus of claim 5 wherein the apparatus further comprises a third capacitor having a first node and a second node, and a fourth capacitor having a first node and a second node; wherein the first node of each of the third and fourth capacitors are connected to the second input of the amplifier, and the second node of the first capacitor is connectable to the output of the apparatus.

7. A camera system comprising:
an image sensor that includes a pixel array that includes a plurality of rows of pixels;
a first input that receives at least one programming control signal;
a second input that receives a reference signal;
an output that generates a boost signal to the pixel array that has at least two programmable levels based on the reference signal;
a first capacitor having a first node and a second node, the first node being connectable to the output by way of a first switch; and
a second capacitor having a first node and a second node, the first node of the second capacitor being connectable to the output by way of a second switch, the second node of the second capacitor being directly connected to the second node of the first capacitor;
wherein the first switch and the second switch are controllable by the at least one programming control signal.

8. The system of claim 7, and further including an amplifier that includes a first input that receives the reference signal, and an output, wherein a third capacitor is connected between the output of the amplifier and the output of the system; and wherein the second nodes of the first and second capacitors are connected to a second input of the amplifier.

9. The system of claim 7 wherein the system further comprises a third switch connected between the first and second switches and the system output, the third switch being controlled by the at least one programming control signal.

10. The system of claim 7 and further comprising a fourth capacitor having a first node and a second node, and a fifth capacitor having a first node and a second node; wherein the first nodes of the fourth and fifth capacitors are coupled to the second input of the amplifier; wherein the second node of the fourth capacitor is connected to the first node of the first capacitor; and wherein the second node of the fifth capacitor is connected to a predetermined voltage.

11. The system of claim 7, and further comprising a fourth switch and a fifth switch controllable by the at least one programming control signal, wherein said fourth switch is connected between the first node of the first capacitor and a voltage, and wherein the fifth switch is connected between the first node of the second capacitor and the voltage.

* * * * *